United States Patent

[11] 3,546,429

[72] Inventors Ralph G Fleet
Ste. Brigitte De Laval;
Charles de Jersey Phillips, Richelieu; Stuart H. Fleet, Ste Foy, Quebec, Canada
[21] Appl. No. 816,623
[22] Filed April 16, 1969
[45] Patented Dec. 8, 1970
[73] Assignee Phydrex Limited
Quebec-Ouest, Quebec, Canada

[54] WATER HEATING DEVICE
4 Claims, 8 Drawing Figs.
[52] U.S. Cl. .................................................... 219/312, 219/316, 219/318
[51] Int. Cl. .................................................... F24h 1/18
[50] Field of Search .......................................... 219/306, 312, 314, 316, 318

[56] References Cited
UNITED STATES PATENTS
| | | | |
|---|---|---|---|
| 2,375,871 | 5/1945 | Reifenberg .................... | 219/316 |
| 2,804,534 | 8/1957 | Coates ........................... | 219/316X |

*Primary Examiner*—J. V. Truhe
*Assistant Examiner*—C. L. Albritton
*Attorney*—Raymond A. Robic ABSTRACT: A water heating device comprising a closed tank, a heating element attached to the vertical wall of the tank and projecting inwardly into the tank, a hood also attached to the wall of the tank and overlying said heating element in spaced relation thereto, the under side of the hood being open for free circulation of water around the heating element, and a discharge tube connected to the hood and terminating at a point adjacent to the top of the tank for discharging the water heated by the heating element directly into the upper portion of the tank.

PATENTED DEC 8 1970
3,546,429
SHEET 1 OF 2
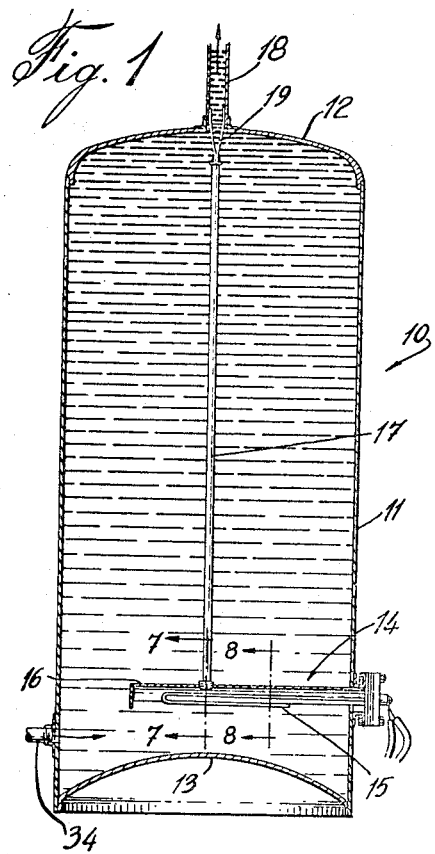
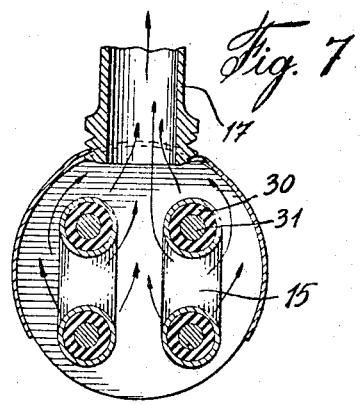
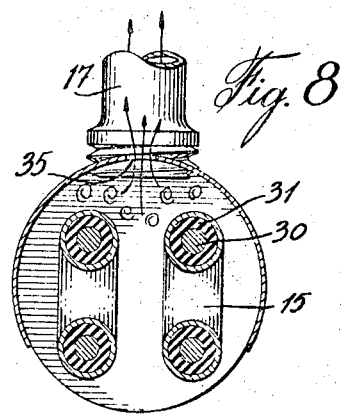
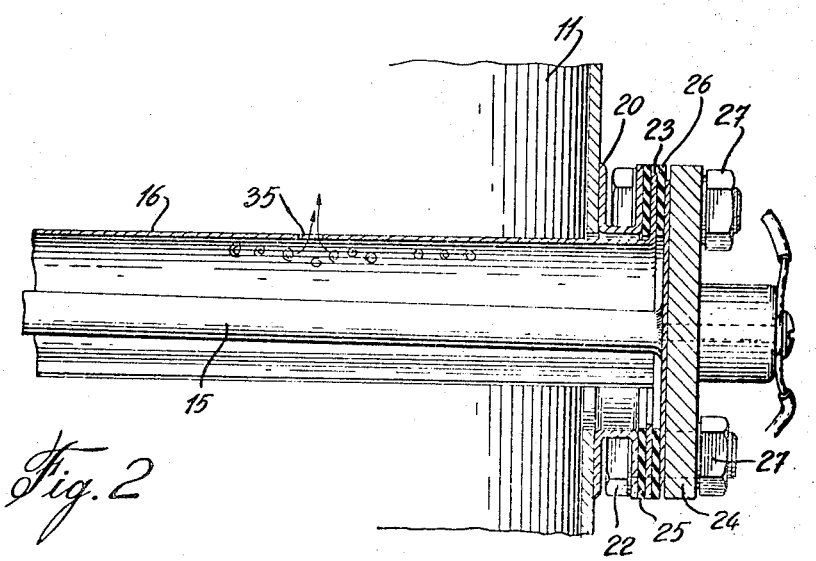
INVENTORS
Ralph Gregoire FLEET
Charles deJERSEY PHILLIPS
Stuart H. FLEET
ATTORNEY PATENTED DEC 8 1970
3,546,429
SHEET 2 OF 2
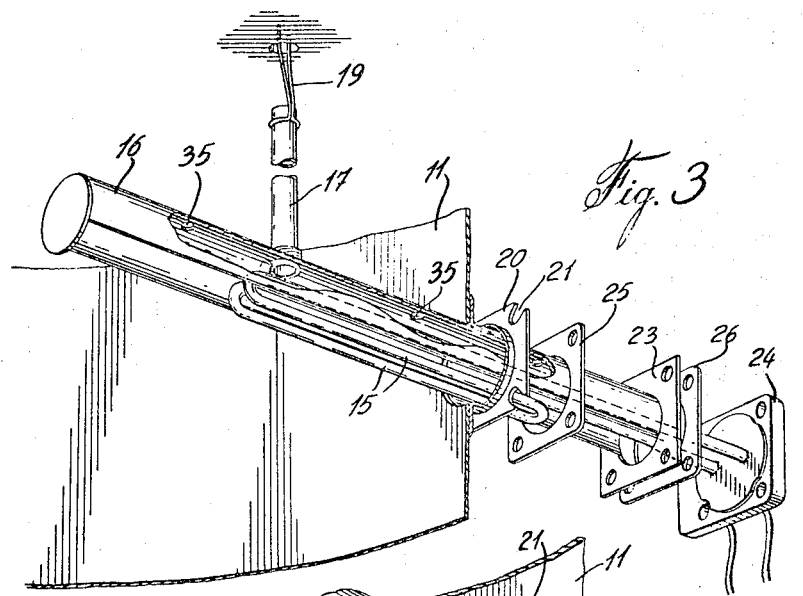
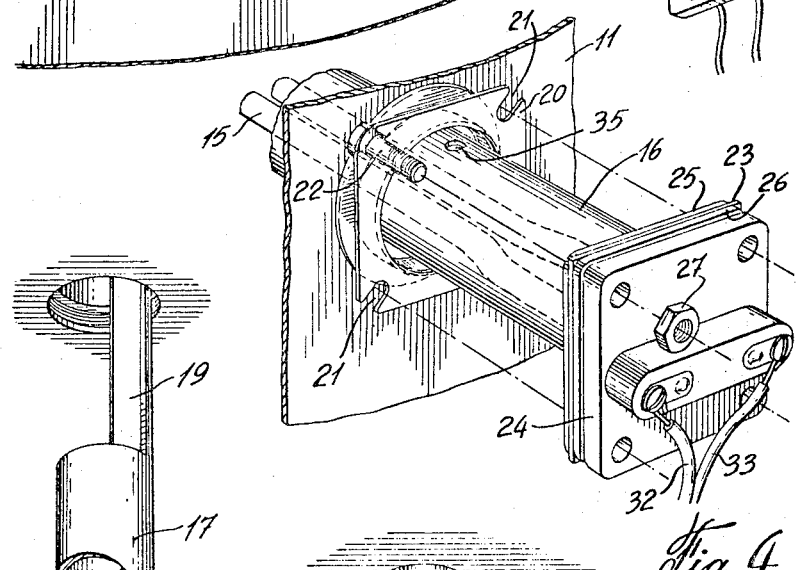
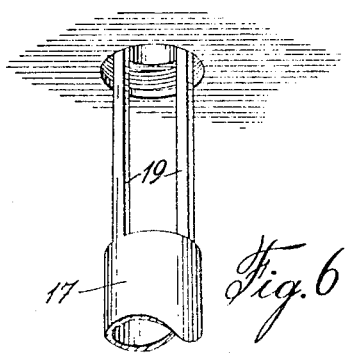
INVENTORS
Ralph Gregoire FLEET
Charles de JERSEY PHILLIPS
Stuart H. FLEET
ATTORNEY

WATER HEATING DEVICE

This invention relates to a water heating device and more particularly to a hot water circulator for use in water tanks providing hot water for domestic use.

Domestic water heaters have been used for years and generally comprise a closed tank connected to a cold water inlet, a heating element disposed in the tank for heating the water contained in the tank, and a hot water outlet supplying hot water to various household appliances. Water heaters have been improved over the years and some of them are equipped with means for providing an almost instantaneous supply of hot water. U.S. Pat. No. 2,784,291 issued Mar. 8, 1957, for example, discloses a water heating device wherein the heating element is contained in a housing having a number of holes therein to allow cold water to enter the housing. Such housing is connected to a tube adapted to discharge the water being heated in the housing directly into the hot water discharge outlet of the tank.

In the above prior art devices, steam pockets are developed in the housing surrounding the heating elements due to the process of quickly heating water in a too restricted area. Such steam pockets rise to the top of the tank through the above mentioned tube and flow in the hot water discharge line thus causing severe line and boiler knocks and danger of steam burns to the hot water users.

In the above-mentioned U.S. Pat. No. 2,784,291, the tube which extends upwardly from the housing containing the heating element terminates in a bell-shaped hood which is connected directly to the hot water discharge outlet. Such hood restricts the circulation of hot water in the tank and prevents filling the complete top portion of the tank with heated water.

The above-mentioned drawbacks are overcome, in accordance with the invention, by using a hood which surrounds the upper portion of the heating element only instead of a housing enclosing the heating element on all sides. The use of an open hood eliminates the pressure buildup of the heated water around the heating element which causes the formation of the above mentioned steam pockets and, in addition, allows the excess hot water that has not risen through the discharge tube to expand downwards through the open portion of the hood under the heating element. Such downwards circulation of heated water from around the heating element and from under the hood preheats the cold water entering the tank through the cold water inlet which is located at a point below the heating element.

A second feature of the invention resides in that the discharge tube which rises up to the top of the tank terminates a given distance from the top of the tank. Consequently, the flow of hot water in the tube is in no way restricted by any direct connection to the hot water discharge outlet and allows the complete top portion of the tank to be filled with heated water which is permitted to circulate freely in the top portion of the tank.

The invention will now be disclosed more fully with reference to the following drawings which illustrate a preferred embodiment of the invention and in which:

FIG. 1 illustrates a vertical-sectional view upon a plane passing through the longitudinal center line of a water tank equipped with a heating device in accordance with the invention;

FIG. 2 is an enlarged section view of a portion of the heating device illustrated in FIG. 1;

FIGS. 3 and 4 are perspective exploded views of the heating device;

FIGS. 5 and 6 illustrate alternative aligning members for maintaining the top portion of the tube in position in the tank;

FIG. 7 illustrates a section view taken along line 7-7 of FIG. 1; and

FIG. 8 illustrates a section taken along lines 8-8 of FIG. 1.

Referring to FIG. 1 of the drawings, there is illustrated generally a cylindrical tank 10 having a vertical wall 11, a dome top 12 and a concave bottom 13, although other configurations are obviously envisaged. Mounted on the lower portion of vertical wall 11 is a heating device designated generally by reference numeral 14 and including a heating element 15 and a hood 16 overlying the heating element in space relation thereto. The under side of hood 16 is open while a tube 17 rises from the top of the hood toward the top of the tank. Tube 17 terminates a predetermined distance from the top of the tank and is alined with a discharge outlet 18 located at the top of the tank. Aligning fingers 19 which will be disclosed more fully in a later part of the description are provided for holding the end of tube 17.

The water heating device is illustrated more clearly in FIGS. 2 to 4 of the drawings wherein the elements corresponding to those of FIG. 1 are identified by the same reference numerals. In addition, there is shown a flange 20 of U-shaped cross section, one leg of which is welded to the vertical wall 11 of the tank and the other leg of which is provided with four slots 21 adapted to receive bolts 22. Hood 16 has a flange 23 at one end thereof and such flange has holes therein which are alined with slots 21 of flange 20 for receiving bolts 22. Heating element 15 is supported by a flange 24 also having holes therein for receiving bolts 22. In the assembly of the water heating device to the vertical wall of the tank, gaskets 25 and 26 are inserted between flanges 20, 23 and 24, as illustrated perhaps more clearly in FIG. 3, and nuts 27 are screwed on bolts 22 for holding the elements of the heating device together. It is to be noted that, in case of failure, the heating element 15 may be removed from the tank without having to remove the hood 16.

Hood 16 is preferably made of stainless steel to insure long life but, obviously, other suitable materials could be used.

Heating element 15 is of the conventional type and comprises, as it may be seen in FIGS. 7 and 8, resistance type heating wires 30 positioned therein and insulated therefrom by insulating material 31. The terminal ends of the heating wires 30 are connected to a suitable electrical power supply by leads 32 and 33 as illustrated in FIG. 4.

The use of a hood 16 instead of the conventional housing around the heating element 15 allows the capture of the water heated by heating element 15 and permits such heated water to rise up to the top of the tank through tube 17. Because hood 16 is open at the bottom, there is no pressure built up around heating element 15 which caused the nondesirable steam pockets encountered in the prior art devices. The excess hot water that has not risen through the tube 17 expands downwardly through the open portion of the hood and preheats the cold water entering the tank at inlet 34 in the vertical wall of the tank.

As mentioned previously, the tube 17 rising from the top of the hood 16 terminates a downwards distance from the top of the tank and is unobstructed in any way so that the heated water from around the heating element 15 and from under the hood 16 is freely allowed to circulate upward through the tube 17, then outward following the contour of the top of the tank, then downward parallel to the vertical walls of the tank in diminishing velocity as it turns inward toward the tube 17 and then rises slowly to join in repeated cycles with the hot water on top of the tank, thus causing an intense circulation of hot water building downwards progressively from the top of the tank. The reverse of the above described circulation occurs in the water at the level below the hood as mentioned previously. The two combined circulations cause the maximum of heated water to be immediately delivered to the top of the tank filling first and immediately the portion of the tank between the upper end of tube 17 and the top of the tank giving an immediate supply of hot water at the outlet 18 of the tank.

The above mentioned circulation continues as long as the heating element is energized by a suitable power supply through a thermostat (not shown), usually located adjacent to the bottom of the tank, until the upper and lower circulations have completely heated the water to a predetermined temperature. When such temperature of the water is reached, the above-mentioned thermostat cuts off the electric current to the heating element as it is known in the art.

When hot water is drawn from the outlet 18 at the top of the tank, an equivalent amount of cold water enters at the bottom of the tank through cold water inlet 34. The change in the temperature immediately activates the thermostat which causes the heating element 15 to heat the cold water and to immediately replace the amount of hot water drawn off from the top of the tank with an equal amount of heated water from under the hood 16 around heating element 15.

In FIG. 1 was illustrated a pair of aligning fingers 19 for maintaining tube 17 in alignment with discharge outlet 18. Such aligning fingers are also used to assist in the installation, orientation and removal of tube 17 through the discharge outlet 18. Aligning fingers 19 protrude through the entry of discharge outlet 18 and spring tightly against the sides of outlet 18 to keep tube 17 in position. Of course, such aligning fingers may take other configurations and may even be integral with the tube 17 such as illustrated in FIGS. 5 and 6.

As illustrated, perhaps more clearly in FIGS. 7 and 8, tube 17 is screwed into the top portion of hood 14. Such is done by means of any suitable tool through the outlet 18 after the heating device has been inserted into the tank and attached to the vertical wall of the tank.

The hood 16 is also provided with holes 35 in the top portion thereof to allow escape of small steam pockets which, despite the novel hood arrangement, could get trapped under the hood as illustrated in FIGS. 2, 3, 4 and 8. Holes 35 may be of various diameters and may vary in number. Their location in the surface of the hood may also vary.

Considerable savings can be realized by using a hood instead of the conventional housing as the former can be made of relatively light and simple stampings with no machining required while the latter requires a relatively heavy casting or assembled series of parts requiring considerable machining.

High savings in maintenance and repairs can also be realized by the use of a hood instead of the conventional housing because, in the case of the former, the heating element remains relatively scale free owing to the fact that the heating element is covered by the hood and completely open on the underside thereof. Furthermore, the heating element may be removed for replacement and for cleaning without disturbing the hood, while in the case of the conventional housing surrounding the heating element, it is obvious that in a short time the element will become completely enveloped in scale necessitating the complete removal and replacement of the heating element and housing.

I claim:

1. A water heating device comprising:
   a. a closed tank;
   b. a heating element attached to the vertical wall of the tank and projecting inwardly into the tank;
   c. a hood also attached to the vertical wall of the tank and overlying said heating element in spaced relation thereto, the underside of said hood being open for free circulation of water around the heating element, holes being provided in the top of said hood to allow escape of small steam pockets which are formed around the heating elements during the heating process and become trapped under the hood; and
   d. a discharged tube connected to the hood and terminating at a point adjacent to the top of the tank for discharging the water heated by the heating element directly into the upper portion of the tank.

2. A water heating device comprising:
   a. a closed tank;
   b. a heating element attached to the vertical wall of the tank and projecting inwardly into the tank;
   c. a hood also attached to the vertical wall of the tank and overlying said heating element in spaced relation thereto, the underside of said hood being open for free circulation of water around the heating element;
   d. a hot water discharge outlet located in the top of the tank; and
   e. a discharge tube connected to the hood and terminating at a point adjacent to the top of the tank for discharging the water heated by the heating element directly into the upper portion of the tank, said discharge tube having aligning fingers secured to the upper end thereof and projecting through said discharge outlet for permitting the installation and removal of the discharge tube through said discharge outlet.

3. A water heating device comprising:
   a. a closed tank;
   b. a heating element attached to the vertical wall of the tank and projecting inwardly into the tank;
   c. a hood also attached to the vertical wall of the tank and overlying said heating element in spaced relation thereto, the underside of said hood being opened for free circulation of water around the heating element;
   d. said hood and heating element being attached to the vertical wall of the tank by means of a flange having a U-shaped cross section, one leg of said U-shaped flange being welded to the vertical wall of the tank and the other leg of said U-shaped flange having slots therein adapted to receive bolts for holding said hood and said heating element; and
   e. a discharge tube connected to the hood and terminating at a point adjacent to the top of the tank for discharging the water heated by the heating element directly into the upper portion of the tank.

4. A water heating element as defined in claim 3, wherein said hood and said heating element each have a flange at their end which is located outside the vertical wall of the tank, said last-mentioned flanges having holes therein corresponding to the slots in said U-shaped flange and through which said bolts protrude to secure the hood and the heating element to said U-shaped flange.